US005731757A

United States Patent [19]

Layson, Jr.

[11] Patent Number: 5,731,757

[45] Date of Patent: Mar. 24, 1998

[54] PORTABLE TRACKING APPARATUS FOR CONTINUOUS POSITION DETERMINATION OF CRIMINAL OFFENDERS AND VICTIMS

[75] Inventor: Hoyt M. Layson, Jr., Palm Harbor, Fla.

[73] Assignee: Pro Tech Monitoring, Inc., Tampa, Fla.

[21] Appl. No.: 699,619

[22] Filed: Aug. 19, 1996

[51] Int. Cl.$^6$ ............................ C08B 21/00; C08B 25/00

[52] U.S. Cl. .......................... 340/573; 340/539; 340/693; 340/825.3; 340/825.49; 342/357; 364/449.6; 379/38

[58] Field of Search ..................................... 340/573, 539, 340/693, 825.3, 825.31, 825.32, 825.49, 825.54; 342/357; 364/449.6; 379/38

[56] References Cited

U.S. PATENT DOCUMENTS

| | | | |
|---|---|---|---|
| 5,043,736 | 8/1991 | Darnell et al. | 342/357 |
| 5,170,426 | 12/1992 | D'Alessio et al. | 379/38 |
| 5,204,670 | 4/1993 | Stinton | 340/825.54 |
| 5,255,306 | 10/1993 | Melton et al. | 379/38 |
| 5,379,224 | 1/1995 | Brown et al. | 364/449.9 |
| 5,461,390 | 10/1995 | Hoshen | 342/419 |
| 5,652,570 | 7/1997 | Lepkofker | 340/573 |

*Primary Examiner*—Glen Swann
*Attorney, Agent, or Firm*—Larson & Larson, P.A.; Herbert W. Larson

[57] ABSTRACT

A portable locator or tracking apparatus is provided for continuous location determination of subjects which communicates with a body-worn, non-removable, tamper resistant transceiver and a central data-base system. The portable tracking apparatus has a Global Position System (GPS) receiver and inertial sensors for determining location, microprocessors for logic and mathematical algorithm processing, memory for programs and data, a wireless transceiver for communications with the body-worn device, a wireless transceiver for communicating with the central data-base system, an alpha-numeric display for displaying text messages sent to the subject acoustic speaker and microphone for voice and tone messages with subjects, electronic tamper sensors, motion sensors, attitude position sensor, batteries and external connectors for power, recharge, communications and auxiliary antennas.

20 Claims, 9 Drawing Sheets

PORTABLE TRACKING APPARATUS FOR CONTINUOUS POSITION DETERMINATION OF CRIMINAL OFFENDERS AND VICTIMS

BACKGROUND OF THE INVENTION

1. Field of the Invention

This invention relates to electronic monitoring and tracking of persons. More particularly, it relates to collecting and storing locations of an offender or victim subjects for either real-time or post-time evaluation and response based on schedule rules and location constraints for the person (subject). It further includes the capability to provide advance offender violation warning for victims beyond the confines of the victim's home.

2. Description of Prior Art

Currently, determining the location of subjects, such as criminal offenders and victims, has only been possible by electronic monitoring means at fixed locations, such as the subject's residence. The system used to electronically monitor the subject, known to the art as a house arrest system, uses a body-worn device which typically transmits a signal to a receiver powered by an electrical outlet communicating to a central monitoring service over a standard telephone line at the offender's residence. These devices can be seen in U.S. Pat. Nos. 5,170,426, 5,255,306 and 5,204,670.

Victims are typically provided a receiver which is tuned to the frequency of the transmitting device worn by the offender. The victim's receiver is powered by an electrical outlet and communicates to a central monitoring service over a standard telephone line at the victim's residence. The receiver distance range of victim warning is currently limited by the transmit distance range of the offender's body-worn device, typically several hundred feet in free air.

Recently, the concept of using triangulation of radio signals, such as the Department of Defense Global Positioning System (GPS) satellite constellation, was described in U.S. Pat. No. 5,461,390. This system provides improved location determination beyond the subject's residence but relies on the central data-base system for real-time determination of a subject's location. The critical path for real-time notification becomes the wireless link to the central database system and the ability of the central data-base system to concurrently monitor many subjects in real-time.

There exists a need to improve known house arrest systems to locate subjects such as criminal offenders and monitor their movements with respect to any associated victims or off-limit areas at all times.

SUMMARY OF THE INVENTION

The centralized data-base real-time critical path processing problem is solved by this invention utilizing a portable tracking device which places scheduling rules and location constraint processing intelligence with a subject. This implementation makes the portable tracking device with the subject a processing node on an overall network, thus distributing the processing and providing real-time event processing not achievable through a centralized approach which relies on a central data-base system for determining when all event processing occurs.

The portable tracking apparatus is responsive to a wireless system in communication with a global positioning system (GPS) satellite constellation for determining the spatial coordinates of a subject. These coordinates are conveyed to a central data-base. In addition, the portable tracking apparatus communicates with a body-worn device on an offender or victim subject. The body device includes a panic button which triggers immediate communication to the central data base.

The portable tracking apparatus is enclosed within a housing having tamper proof screws holding a top and bottom cover in place. The housing contains a GPS antenna for communication with the GPS satellite constellation for determining the spatial coordinates of the portable tracking apparatus. A memory card with algorithms and a processor compares the current location of the portable tracking apparatus with schedule rules and location constraints for the subject. An antenna and transceiver communicates with a subject's body-worn device and the central data-base. A message display window on the portable tracking apparatus permits direct communication to the subject wearing the body-worn device. A motion detector communicates with the central data-base to notify the central data-base when the subject is in transit. A speaker and microphone provide tone and interactive voice communications with the subject.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
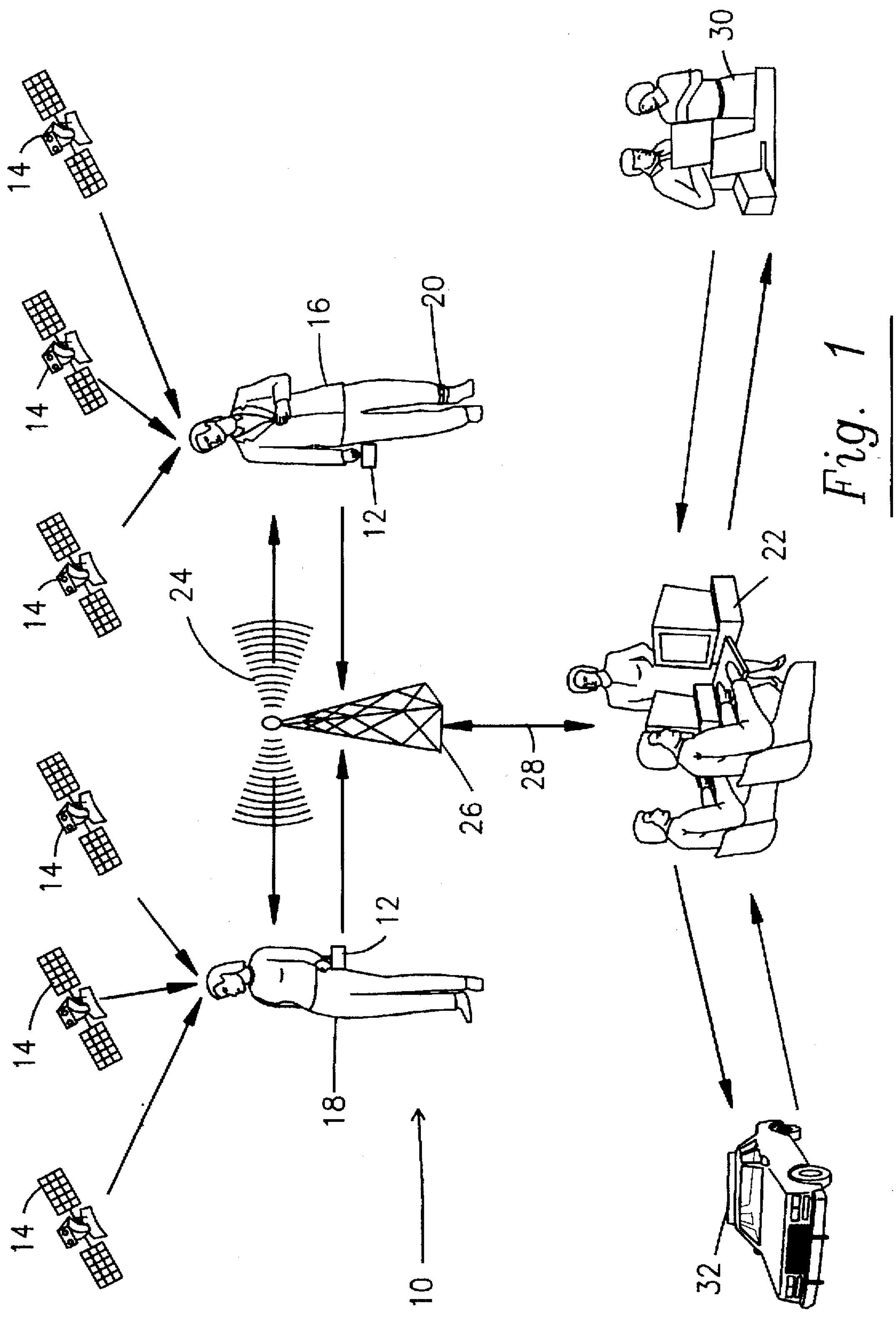
FIG. 1 is a diagram describing the major elements of the system incorporating the portable tracking apparatus.

Throughout the following detailed description, the same reference numerals refer to the same elements in all figures.

FIG. 1 illustrates an overall system 10 incorporating a portable tracking device 12 which receives communication signals from a global position satellite (GPS) 14 to determine the location of the subject (offender 16 or victim 18). When continuous location of the offender 16 is desired, the offender 16 is fitted with a body-worn device 20 which is non-removable by the offender 16 and provides tamper detection to generate alarms should the offender 16 attempt to remove the body-worn device 20. When the continuous location for the victim 18 is desired, the victim 18 can be provided a portable tracking device 12 and the body-worn device 20 can be a garment clip-on version or an actual body-worn device.

The portable tracking device 12 communicates with the body-worn device 20. Tamper detection in the body-worn device 20 or pressing the panic button 86 (FIG. 5) will generate an alarm on the portable tracking device 12 which forwards the alarm to the central data-base system 22 via the wireless communication link 24 if the subject attempts to remove or tamper with the body-worn device. The wireless network cell site 26 processes the wireless signals and switches the communication through the mobile switching office to the public switched telephone network 28 as is known in the prior art.

The communication from the subject's portable tracking device 12 is routed to the central data-base system 22 where response decisions for notification to parole and probation 30, victims 18 and law enforcement 32 are made based on schedule rules and location constraints provided by the supervising agency such as parole and probation 30.

The central data-base system 22 communicates to the subject's portable tracking device 12 via the wireless communication link 24 or a telephone line when not portable in order to load updated schedule rules and location constraints. Data and voice messages can be sent to the subjects based either on a schedule from the central data-base system 22, in response to central data-base system data fusion (such as encounters based on the dynamic movements of offenders and victims) or direct input from probation and parole 30 and law enforcement 32. At any time the central data-base system 22 may be commanded by law enforcement 32 or other agencies such as parole and probation 30 to query the portable tracking device 12 to ascertain the immediate status of the portable tracking device 12 and the location of the offender 16 or victim 18.

Queries for location history data can be performed by law enforcement 32 and parole and probation 30 to identify offenders 16 in the vicinity at the time a crime was committed.

Figure 2:
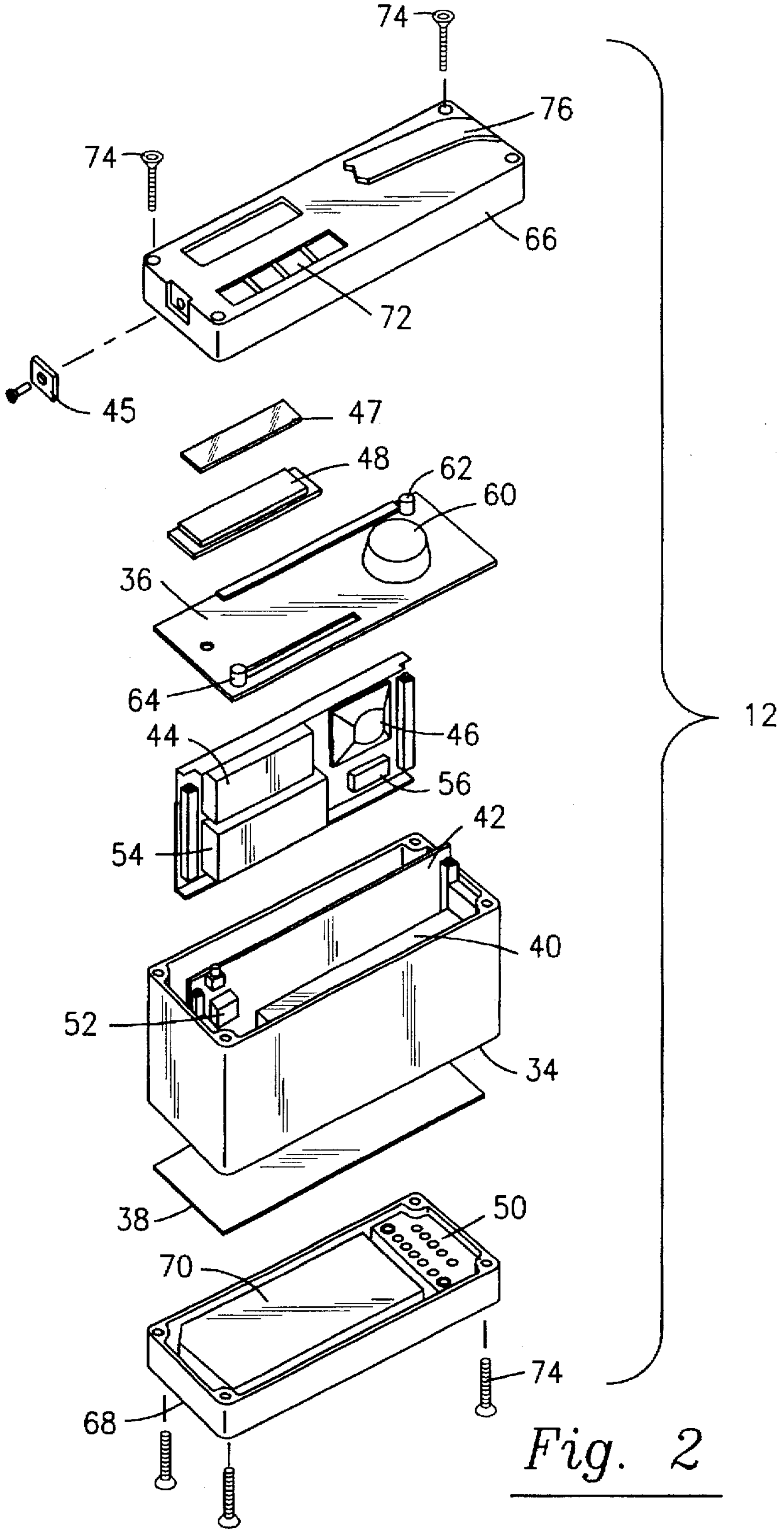
FIG. 2 is an exploded view of the portable tracking device.

The portable tracking device shown in FIG. 2 has a housing 34 made from aluminum to provide strength, shielding, vibration isolation, shock isolation, mounting and maximum heat dissipation for the electronic circuit boards and components with the minimum of weight. The top 36 and bottom 38 covers are shields to further isolate the electronics from outside interference.

The wireless transceiver 40 provides two-way data and voice communications between the portable tracking device 12 and the central data-base system 22. The portable tracking device processor and memory card 42 senses the presence of a land line attached to the portable tracking device via the recharging stand 58 (FIG. 4) and routes communication through the telephone line of the public switched telephone network 28; otherwise the communication is performed by wireless communications.

The portable tracking device processor and memory card 42 provides the execution environment for the algorithms to compare the current location obtained from the GPS receiver 44 or a miniature inertial navigation system updated periodically by GPS receiver against the schedule rules and location constraints stored in the memory of the portable tracking device. Any violations regarding the subject's current location causes the portable tracking device 12 to generate an audible alarm through the speaker 46 and a text message on the display 48. A flexiglass cover 47 protects the display 48. The audible alarm can either be tones or digitized voice stored within the memory of the portable tracking device. At the same time, the portable tracking device 12 may, based on schedule rules, send a data message to the central data-base system 22 using the wireless transceiver 40 or through the attached land line through connector 50. The portable tracking device 12 will continue sending the violation data until an acknowledgment is received from the central data-base system 22. The algorithms in the processor and memory card 42 also perform checking on the status of: communications with the body-worn device 20; communications with the central data-base system 22; battery levels with the body-worn devices 20; and the portable tracking apparatus. Alarms, warnings and instructions are provided for the subject using text displays and audio capabilities of the portable tracking device. The distance permitted between the portable tracking apparatus 12 and the body-worn device 20 is programmed into the memory card. The distance can vary from a few feet to several hundred yards.

A three degree of freedom motion detector 52 provides movement information should GPS or inertial data not be available. The motion sensor array also provides an inclination sensor to determine the current attitude orientation of the portable tracking device. The proper inclination assures optimum performance for the GPS, cellular and body-worn device receiver antennas.

The body-worn device transceiver 54 communicates with the body-worn device 20 to assure that the subject is within a desired distance from the portable tracking apparatus 12. A programmable signal strength level in the transceiver 54 can adjust the distance that the body-worn device 20 can be separated from the portable tracking apparatus 12. The distance is determined by the supervisory agency, set by the central data-base system 22 and transmitted to the portable tracking apparatus 12.

Figure 4:
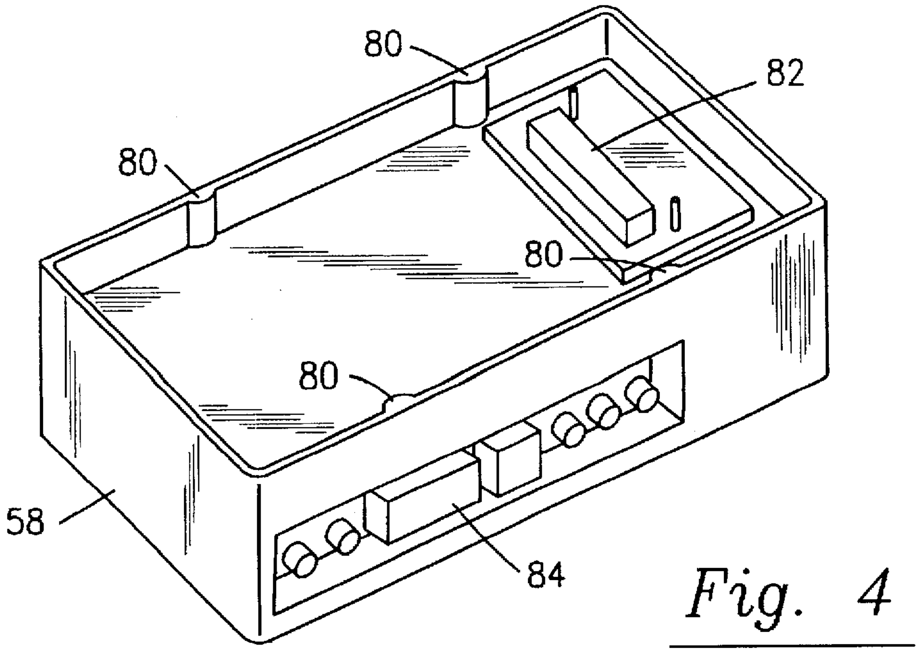
FIG. 4 is a perspective view of the recharging stand.

Antenna switches 56 allow the portable tracking apparatus 12 to select between internal antennas for the body-worn device transceiver 54, GPS transceiver 44 and wireless communications transceiver 40 and external antennas via the connector panel 50 when the portable tracking apparatus 12 is placed in the recharging stand 58 (FIG. 4). This allows for the attachment of external antennas for harsh reception environments such as mobile homes, subterranean dwellings or dense urban work or residence areas.

The internal GPS antenna 60 is placed in an upward facing orientation to best acquire the GPS satellite constellation. The wireless transceiver antenna 62 and bracelet transceiver antenna 64 also are placed at the top of the portable tracking apparatus 12 to provide the optimum orientation from the ground plane. The wireless transceiver 62 and body-worn device transceiver 64 antennas are direct drive round radiators to achieve maximum antenna gain with no protrusion beyond the case of the portable tracking device. This design performs as a capacitive loaded monopole with the length of the transmission line performing as a tunable capacitor to tune the antenna for optimum performance. The top cover 66 of the portable tracking device is a selected plastic such as reinforced polyethylene to provide maximum physical strength with a low dielectric and a minimum of radio frequency attenuation and weight.

The bottom cover 68 of the portable tracking apparatus 12 is a selected plastic such as reinforced polyethylene to provide maximum physical strength with a minimum weight. The bottom cover 68 contains the battery pack 70 so that the center of gravity is lowered to provide maximum stability. The battery pack 70 is lithium metal to provide maximum charge, minimum weight and maximum battery thermal stability for safety.

The connector panel 50 mates with the recharging stand 58 to provide charging, telephone land line communications, external GPS, wireless and body-worn device antennas and an external RS-232 computer communications port for external sensors. The connector panel 50 is located on the bottom to prevent debris from falling or accumulating in the connectors of the panel.

The subject response switches 72 are located on the top of the portable tracking apparatus 12 adjacent to the message display 48 to provide for subject response to messages sent to the portable tracking apparatus 12. The switches 72 are waterproof. The portable tracking apparatus has no forced air ventilation and is water resistant.

The liquid crystal message display 48 conserves power and contains a backlight for operation during darkness. The backlight is activated when a message appears or when one of the response switches 72 is depressed and held.

The assembly screws 74 have tamper resistant heads. The assembly screw threads are conductive with their engaging threads and serve as electronic tamper sensors which can detect when the assembly screws are in the process of being removed. Wires from the engaging threads lead to the processor and memory card 42.

A handle strap 76 is a woven web plastic for strength, chemical resistance and lightweight characteristics. It is held to the top cover 66 by a retaining clip 45 on each side edge of the cover.

Figure 3:
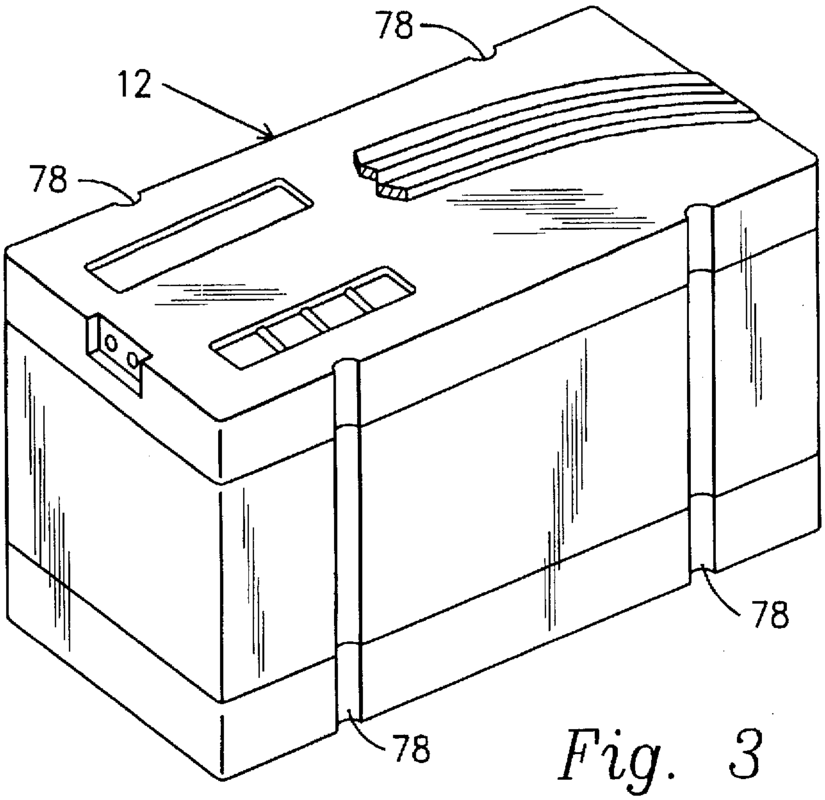
FIG. 3 is a perspective view of the portable tracking device.

The assembled portable tracking apparatus 12 shown in FIG. 3, fits into the recharging stand 58. The portable tracking apparatus 12 has alignment grooves 78 to assure proper orientation to mating tangs 80 in the recharging stand 58. A connector panel 82 of the recharging stand 58 provides the interface for all external connections to the portable tracking apparatus 12.

The external connections to the recharging stand are provided through the recharging stand auxiliary connector panel 84. The power provided to the recharging stand 58 is 12 volts DC through either a wall outlet transformer or an automobile style cigarette lighter plug. The connections in addition to power are; GPS antenna, wireless transceiver antenna, body-worn device antenna and RS-232 computer serial interface.

Figure 5:
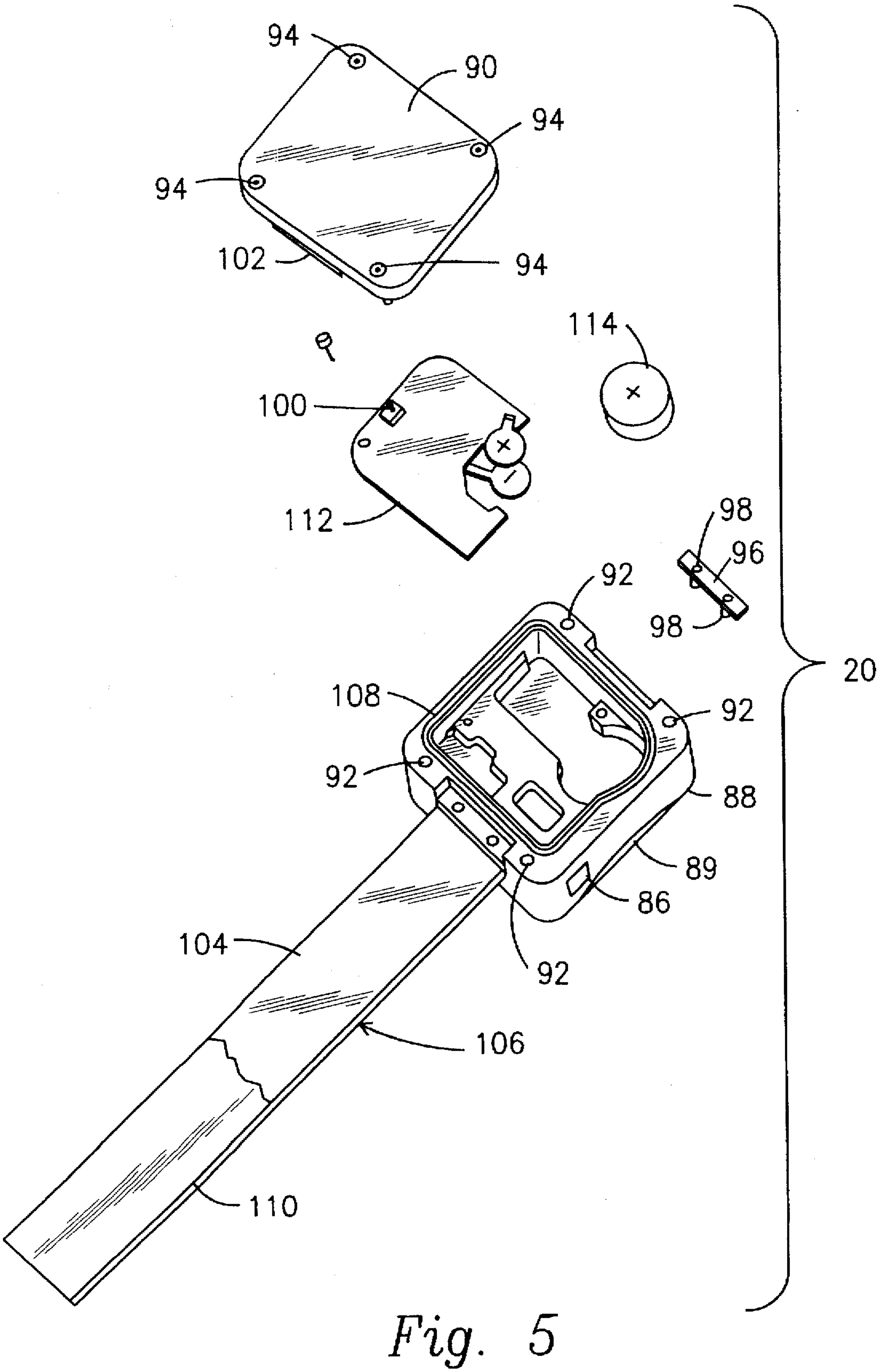
FIG. 5 is an exploded view of the body-worn device.

A subject body-worn device 20 is shown in FIG. 5. For the offender, the body-worn device is an ankle bracelet fitted to the offender by the supervising agency, in this case corrections parole and probation. The body-worn device has a panic button 86 which when depressed by the subject, causes the body-worn device 20 to transmit a distress code to the portable tracking apparatus 12. This distress code is forwarded by the portable tracking apparatus 12 to the central data-base system 22 with the location and identification of the subject.

The inside face of the body-worn device housing 88 is formed with a radius 89 to conform with the shape of the leg of the subject. The housing 88 and cover 90 of the body-worn device is a high impact plastic such as polypropylene to accommodate the impacts associated with being attached to the subject's leg.

The cover 90 is attached to the housing 88 using self-locking inserts 92 placed in the housing 88 to prevent shock, vibration, temperature cycling or movement from loosening the captive tamper resistant screws 94 that attach the cover 90 to the housing 88. When the cover 90 is attached to housing 88 it covers the strap clamp 96 and its captive tamper resistant screws 98. The cover 90 rests against a tamper resistant switch 100 on a circuit board 112 which detects when the cover 90 is removed. The cover 90 contains a gasket flange 102 which compresses a neoprene coating 104 of the strap 106 when the cover 90 is attached to prevent contaminant build-up where the strap 106 attaches to the housing 88. The housing 88 has a continuous gasket groove for a waterproof O-ring 108 which protects the inside of the housing from water intrusion to two atmospheres.

The attaching strap 106 has an inner layer of stainless steel foil 110 to prevent stretching the strap and provide conductivity for the strap continuity tamper circuit. It prevents brazing or soldering jumper wires to circumvent the continuity circuit if the strap 106 is cut. The stainless steel foil 110 of the strap 106 also serves as the antenna for the body-worn device 20. The attaching strap 106 outer layer of neoprene rubber 104 provides a soft strap inert to body oils, detergent, solvents and water.

The body-worn device circuit board 112 contains tamper detection logic to detect when the attaching strap 106 is cut or when the cover 90 is removed. The circuit board 112 transmits any tamper detection to the portable tracking apparatus 12 which generates tamper alarms with the subject and at the central data-base system 22. Only supervising agency personnel can reset the tamper detection latch 114 by reprogramming the microporcessor on the circuit board 112. The circuit board 112 also detects a low battery condition and notifies the subject via the portable tracking apparatus 12 and notifies the central data-base system 22.

Figure 6A:
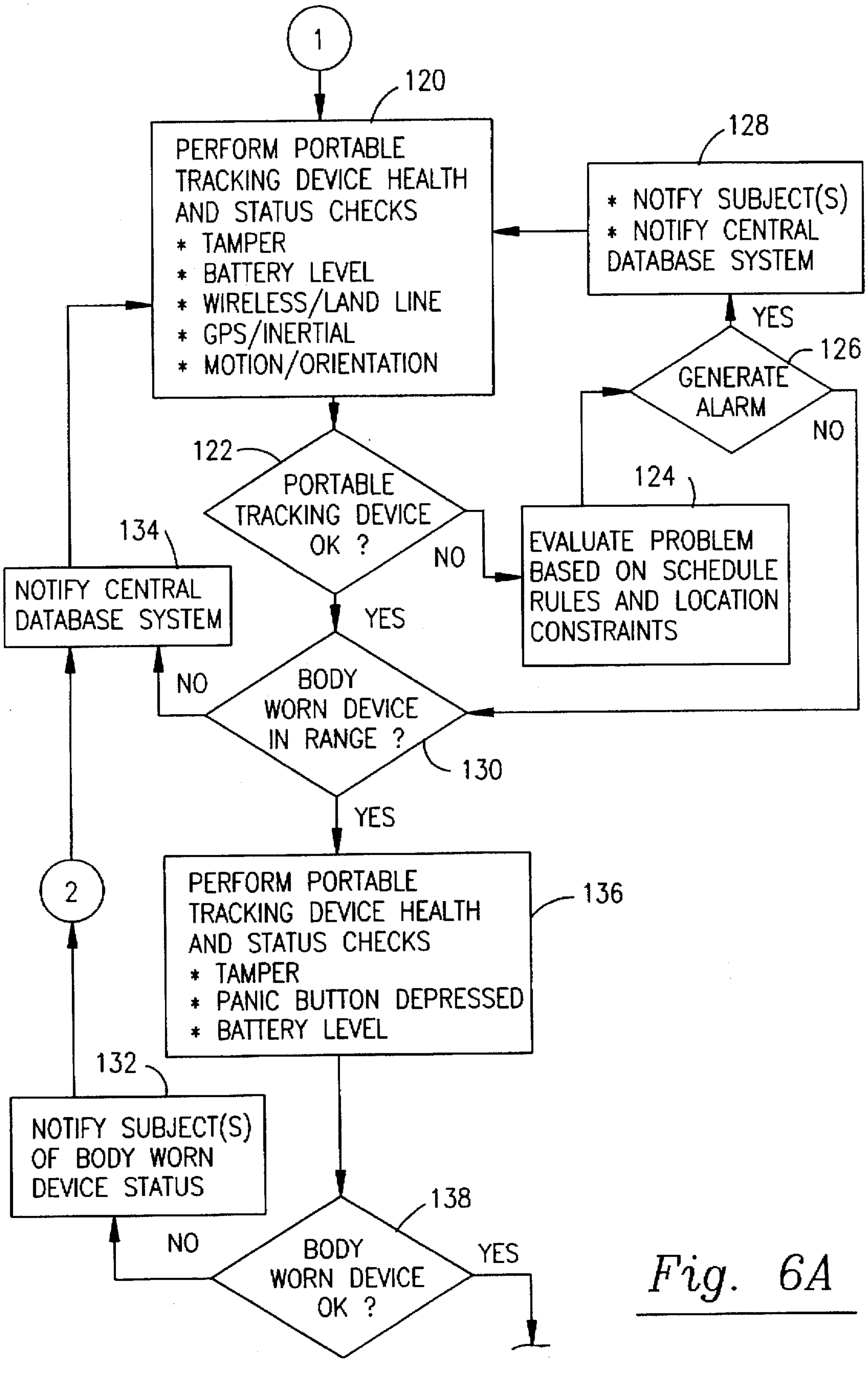
FIG. 6A–6C is a flowchart of the method of operation of the portable tracking device.
Figure 6B:
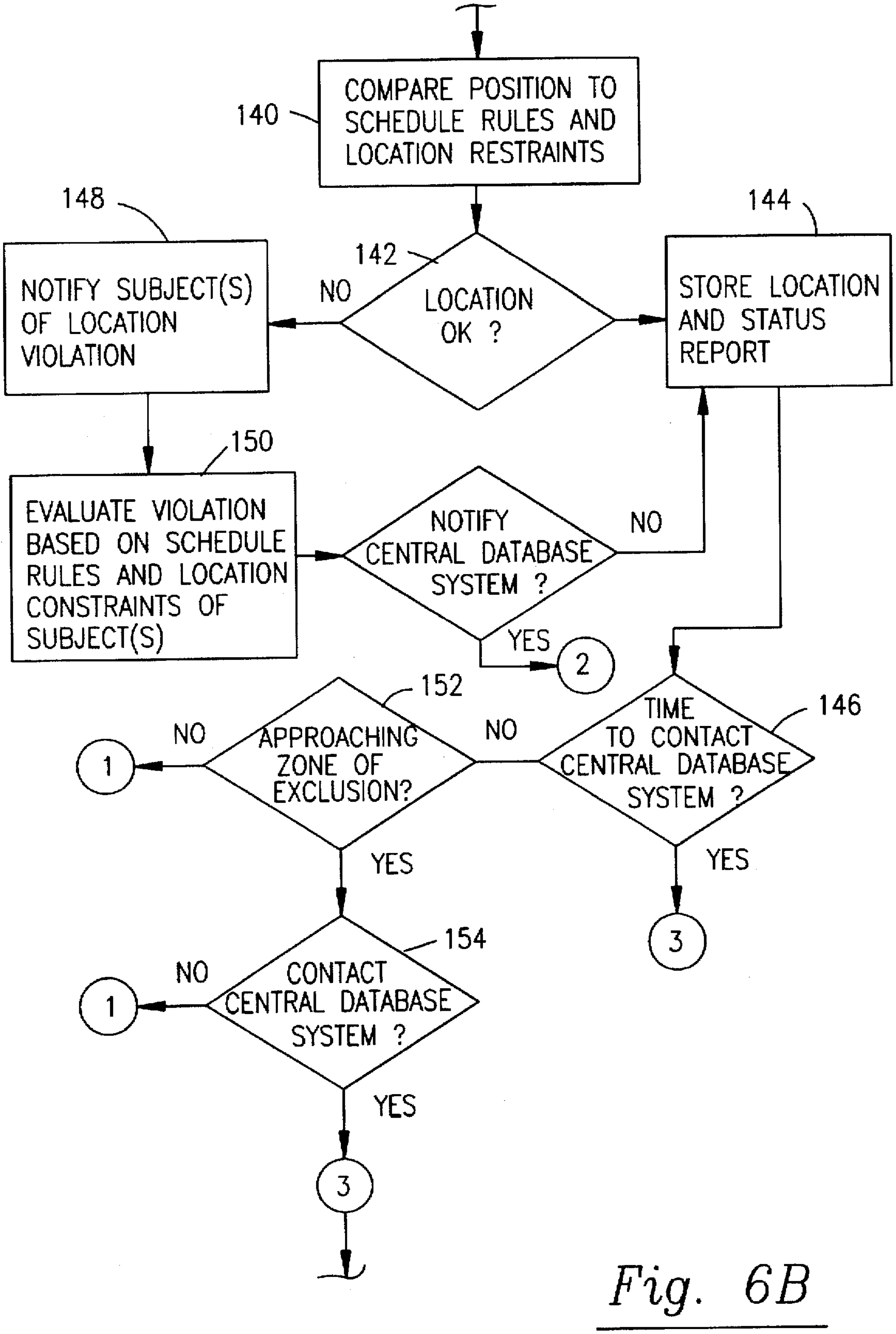
Figure 6C:
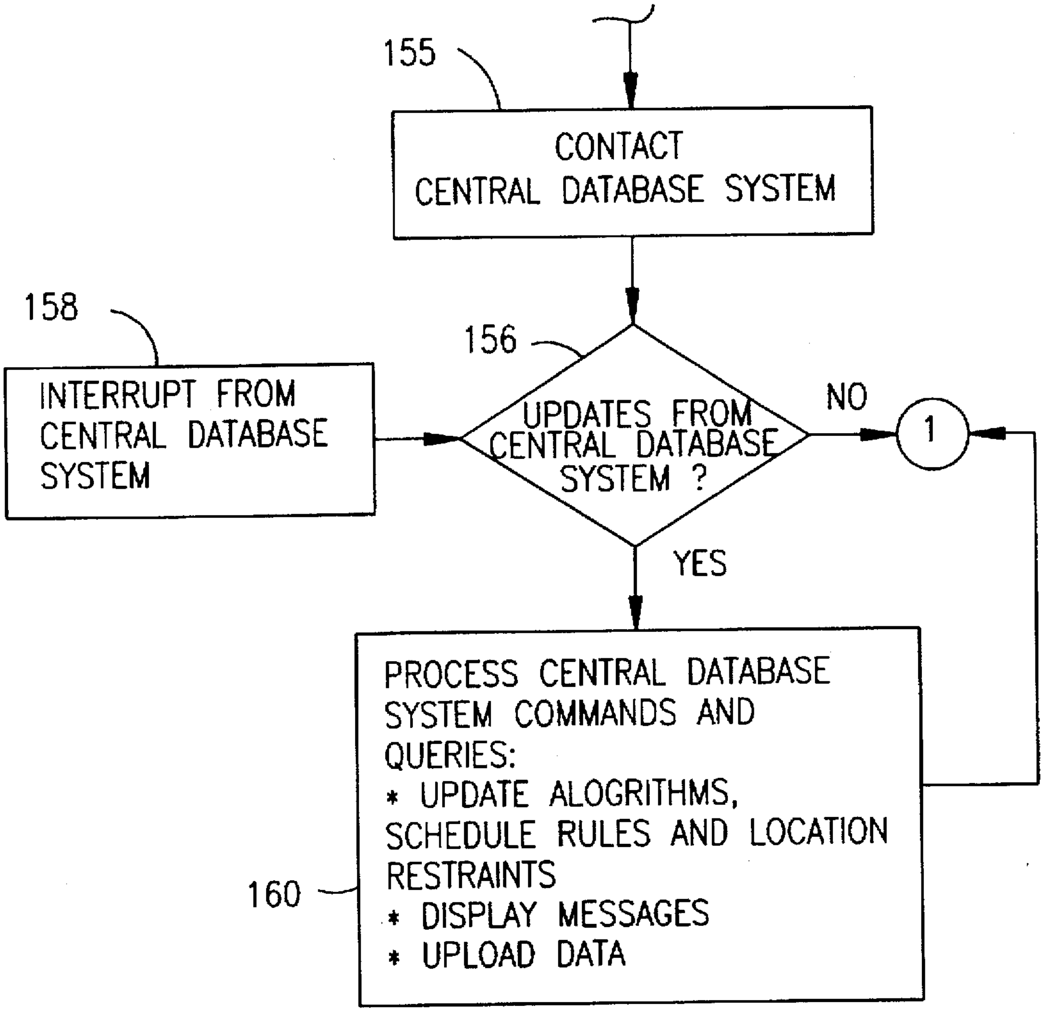

FIG. 6 depicts the iterative algorithm processing performed by the portable tracking device apparatus 12. After a subject's enrollment into the central data-base system 22 the subject is bound to a portable tracking apparatus and a body-worn device 20 which comprise a unique identification. The central data-base system 22 downloads the subject's schedule rules and location constraints to the portable tracking device 12.

The portable tracking apparatus 12 repeats an iterative process of checking its health and status, checking the health and status of the bound body-worn device 20 and comparing the subject's current location against the schedule rules and location constraints. Any anomalies or violations during this iterative process invoke alarm messages and audible tones to the subject to notify the subject of the nature of the alarm or violation.

The portable tracking apparatus 12 processing starts with checking its health and status 120. This includes the status of the electronic tamper sensors to assure that the case integrity has not been violated. Battery level is monitored and the subject is notified to place the portable tracking device in the recharging stand 58 should battery time reach a minimum level. Communications with the central data-base system 22 is checked. If the portable tracking device is fitted in the recharging stand, the presence of the public switched telephone network is checked as well as the signal strength of the wireless network. The status of the GPS receiver and the inertial sensors are checked to verify location determining capability. If there are any anomalies 122 then the portable tracking device evaluates 124 its notification response based on the schedule rules and location constraints for the subject. The response may include the generation of alarms 126 with notification 128 to the subject using audible tones, displaying text messages and stored speech and notification to the central data-base system 22.

Once the status of the portable tracking apparatus 12 has been established, the presence of the body-worn device 20 is verified 130 to be within the desired range. Should the body-worn device 20 be beyond the desired range or loss of contact with the body-worn device 20 is experienced, the subject 132 and the central data-base system are notified 134.

Once communication with the body-worn device is confirmed, the portable tracking apparatus evaluates the health and status of the body-worn device 136. The body-worn device transmits a data stream that includes the status of the electronic tamper sensors, panic button depressed indication and battery level. Should any of the status transmitted from the body-worn device indicate tamper, panic or low battery then the portable tracking device will notify the subject 132 and the central data-base system 134.

Once the status of the body-worn device has been established 138, the current location is compared to the schedule rules and location constraints 140 of the subject. If the current location complies with the schedule rules and the location constraints 142 for the subject, then the location and status data is stored 144 in the portable tracking apparatus to be transmitted to the central data-base system on the next scheduled communication 146. If the current location violates the schedule rules and location constraints of the subject then the subject is notified 148 and the response to the central data-base system is evaluated against the schedule rules and location constraints 150 for the subject.

If the current location complies with the schedule rules and location constraints for the subject 142, then the current location and status is stored in the portable tracking device 144. The portable tracking apparatus checks the next scheduled time for communications with the central data-base system 146 to upload all location and status data. The portable tracking apparatus compares its current location to locations of known marginal wireless signal strength 152. If the portable tracking device is approaching a wireless zone of exclusion it will determine 154 based on the schedule rules of the subject whether to contact 155 the central data-base system. Once the portable tracking device uploads data it will respond to command messages from the central data-base system 156 and download any updates to algorithms, schedule rules or location constraints for the subject.

The portable tracking device interrupts its iterative processing when the central data-base system contacts the portable tracking device 158 and responds to commands or queries 160 from the central data-base system.

Figure 7A:
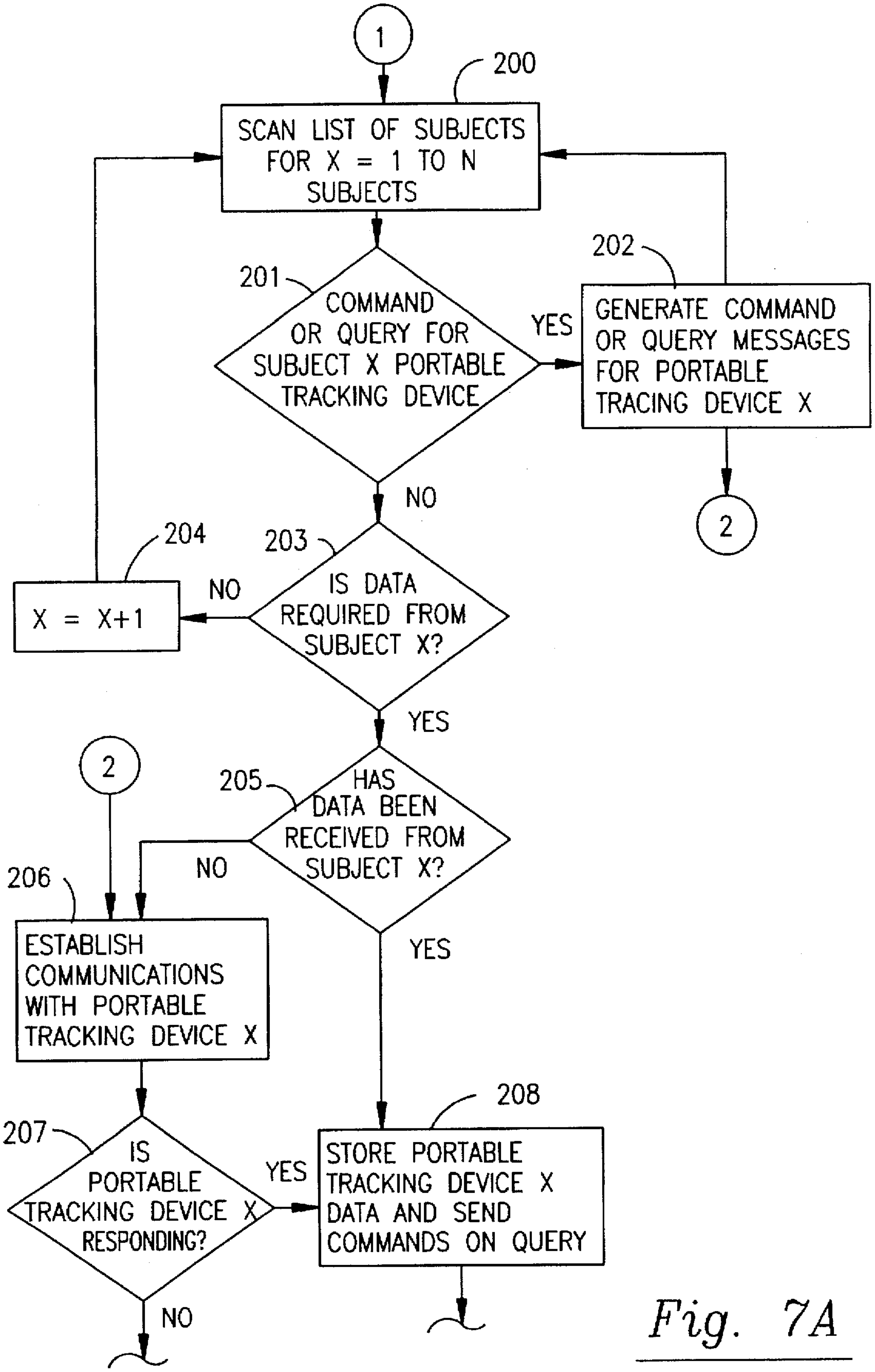
FIG. 7A–7B is a flowchart of the method of operation of the central data-base system communicating with the portable tracking device.
Figure 7B:
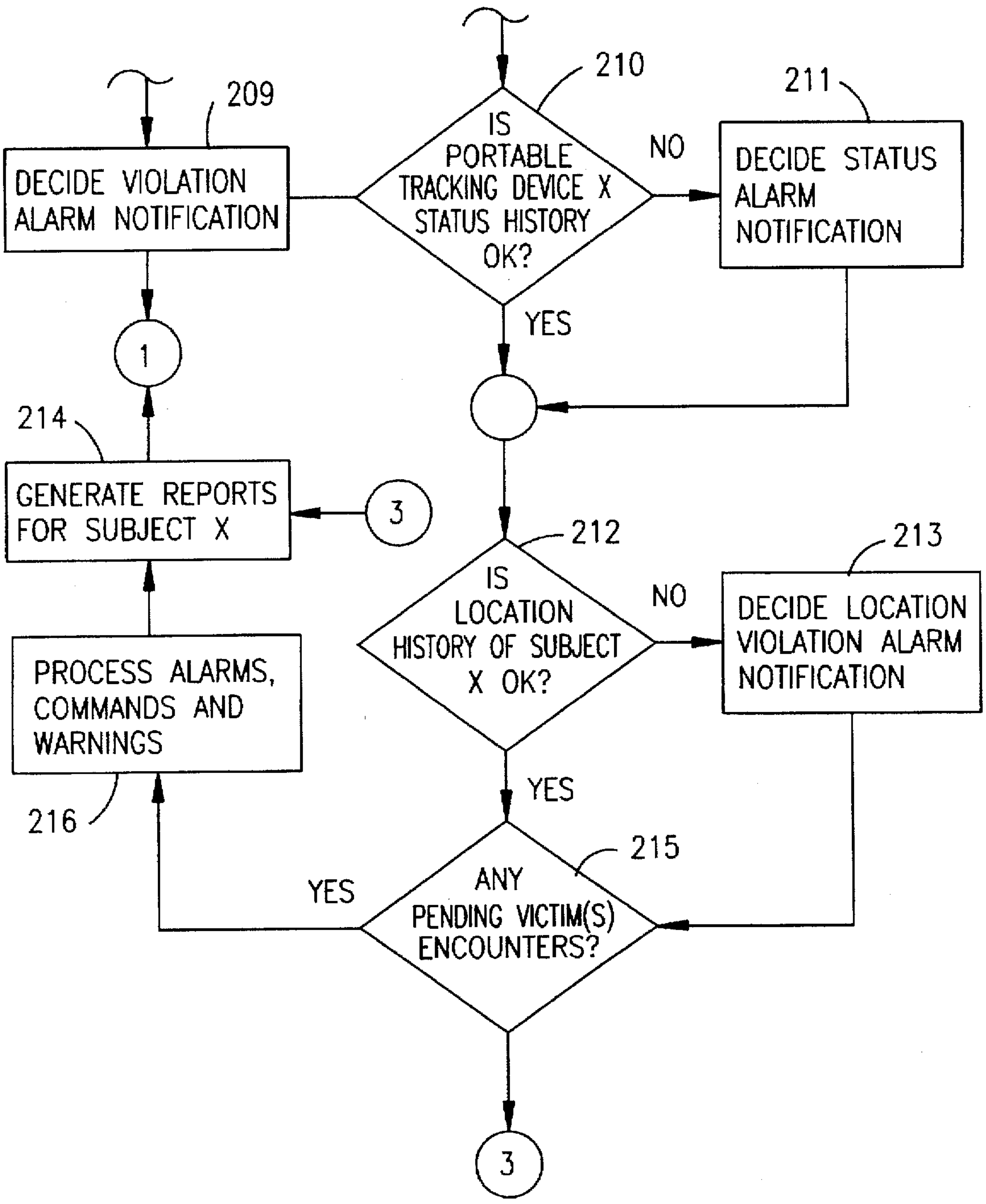

FIG. 7 depicts the iterative algorithm processing performed by the central data-base system 22. In addition the central data-base system 22 implements distributed and parallel processing in order to perform event processing for the multiple portable tracking apparatus in real-time.

The central data-base system 22 iterative process scans a schedule list for all subjects 200 to determine the deterministic reporting intervals based on schedule rules. The central data-base system evaluates if the subject's portable tracking apparatus requires a command or query message 201 based on results of previous violations, updates from the supervising agency or as a result of data fusion processing.

If a portable tracking device requires immediate contact for commands or queries, the central data-base system generates the data messages 202 to update the portable tracking device. The central data-base system will attempt communications with the portable tracking device 206. If the portable tracking device responds then its location and status data is stored in the central data-base system and commands and queries are sent to the portable tracking device 208. If data is not required from the current subject 203 on the list, then the next subject 204 will be scanned 200.

If data is required from the current subject 203 and if a portable tracking device has not reported to the central data-base system by a defined time duration 205, the central data-base system polls the subject's portable tracking apparatus 206. If the portable tracking apparatus does not respond to the polling message 207, the central data-base system uses the schedule rules to determine further actions regarding alarms and notifications 209.

Upon successful data transfer from the portable tracking device, the central data-base system stores the location and status data 208. The central data-base system analyzes the location and status data stream received from the portable tracking device 210 to determine current and past status generated by the portable tracking device since the previous data transfer. If any of the status data received indicates anomalies, the central data-base system examines the profile of the subject 211 contained in the schedule rules to determine if any further alarm notification is required.

The central data-base system examines the present and past locations of the subject 212 since the previous data transfer. If any of the locations are violations, the central data-base system examines the profile of the subject 213 to determine if any further violation notification is required. An offender's current position relative to any associated victim's current position is analyzed by data fusion 215 to determine if any alarms to law enforcement or corrections, commands to the offender and warnings to the victim are required based on the dynamic movements of the offender and victim. The central data-base system then builds reports 214 based on the data received.

The central data-base system is implemented as a distributed parallel process allowing simultaneous sessions between the central data-base system and subject. Each session can perform different functions at the same point in time. The degree of concurrency is dependent on the number of parallel processes implemented on the distributed network of the central data-base system.

The portable tracking apparatus makes an instant determination when violations occur. This is an intelligent apparatus capable of autonomous actions such as: (1) notifying the subject in real-time of any violations or warnings, (2) contacting the central data-base system with violation and panic notifications and (3) logging all events and locations should wireless or land line communications not be available. This autonomy is accomplished by the central data-base system contacting the portable tracking device and downloading schedule rules and location constraints to the portable tracking device. By including wider buffer zones for locations that are meant to include or exclude a subject, the portable tracking device provides advanced notification to victims far beyond the transmitter range of the subject's body-worn device.

By monitoring the signal strength of the wireless network, the portable tracking apparatus remembers areas of marginal or no wireless coverage and contacts the central data-base system when the apparatus is approaching these zones of exclusion for wireless coverage and provides more reliable last known location information for the subject.

This distributed processing approach off-loads the central data-base system from collecting data in a continuous or real-time mode and allows the central data-base system to perform more temporal tasks such as data fusion where it analyzes developing situations such as a stalker-victim encounters and issues the appropriate warnings and instructions to all subjects. This approach also is more cost effective since communication costs are event driven by the portable tracking apparatus rather than continuous or intermittent based solely on scheduling of communication periods.

The portable tracking apparatus notifies the subject of commands, instructions, violations and warnings by messages through either audio or visual means. The audio means of communication with the subject is performed using digitized voice messages or audio tone messages stored in the portable tracking apparatus or sent to the subject in real-time from the central data-base system. Analog or digital live or pre-recorded audio are performed using the portable tracking apparatus speaker. Interactive voice communication with the subject is achieved using the portable tracking apparatus microphone (not shown). The visual means of communication with the subject is performed using an alpha numeric text display 48. The text messages can originate from text messages stored within the portable tracking apparatus or received in real-time from the central data-base system. Responses or confirmations from the subject are performed using subject response buttons 72 on the portable tracking apparatus or the microphone.

The portable tracking apparatus 12 also autonomously processes alarm events that occur with the body-worn device and the portable tracking apparatus. These events include panic button depressed, tapering, battery and wireless health and status information. Tapering with the body-worn device attachment strap or component case causes an immediate transmission to the portable tracking apparatus where it generates alarm messages with the subject and also tamper detection status is sent to the central data-base system. The health of the body-worn device, such as battery level and wireless signal strength also is sent to the portable tracking apparatus for transfer to the central data-base system. Tampering with the portable tracking apparatus is recognized by the portable tracking apparatus and generates alarms with the subject and at the central data-base system. Loss or corruption of the signal from the body-worn device, loss of GPS signal or loss of communications, wireless or land line generates alarms with the subject and at the central data-base system.

For data security reasons, data is exchanged between the body-worn device and the portable tracking apparatus and between the portable tracking apparatus and the central data-base system using encrypted messages. This prevents actual subject data from being altered or erroneous subject data from being inserted into the central data-base system.

This invention, includes the steps of, for each subject, a process of establishing a subject's schedule rules and location constraints at the central data-base system. The schedule rules are driven by time of day and day of week as to where a subject's location is allowed or not allowed and describe the response actions taken by both the portable tracking apparatus and the central data-base system. The location constraints define locations and a distance radius which constitute a buffer area around a location. Location constraints can be static, or in the case of a moving victim, location constraints can be dynamic. The schedule rules and location constraints are sent from the central data-base system to the portable tracking apparatus where they are continuously processed. The portable tracking apparatus notifies the subject and the central data-base system immediately when a violation occurs. The central data-base system contains guidelines in the schedule rules for each offender regarding the notification response to corrections, law enforcement and victims based on the nature of the offender's violation.

Equivalent elements can be substituted for the elements employed in this invention to obtain substantially the same results in substantially the same way.

Having thus described the invention what is claimed and desired to be secured by Letters Patent is:

1. A portable tracking apparatus for use in a wireless communication system, the portable tracking apparatus responsive to a message from the wireless communication system for determining its own spatial coordinates and conveying the spatial coordinates to a central data-base, the portable tracking apparatus adapted to communicate with a body-worn device, the portable tracking apparatus comprising a housing having a top and bottom cover, the housing enclosing (a) a means to detect tampering with the portable tracking apparatus and the body-worn device, (b) a location means for determining the spatial coordinates of the portable tracking apparatus, (c) a memory card and a processor for use with an algorithm to compare the current location of the portable tracking apparatus with a schedule of rules and location constraints stored in the memory card, (d) a means to communicate with the central data-base and the body-worn device, (e) a means to communicate with a person wearing the body-worn device, and (f) a means for determining movement of the portable tracking apparatus.

2. A portable tracking apparatus according to claim 1 wherein the means to detect tapering with the portable tracking apparatus are tamper resistant screws in a top cover having conductive threads that send a signal to the central data-base when the tamper resistant screws are moved.

3. A portable tracking apparatus according to claim 1 wherein the means to detect tampering with the body-worn device is a wireless signal from the body-worn device if a cover is removed or a strap is cut on the body-worn device.

4. A portable tracking apparatus according to claim 1 wherein the location means for determining the spatial coordinates of the portable tracking apparatus is an internal GPS antenna.

5. A portable tracking apparatus according to claim 1 wherein the means to communicate with the central data-base is a wireless transceiver.

6. A portable tracking apparatus according to claim 1 wherein the means to communicate with the central data-base is a land line.

7. A portable tracking apparatus according to claim 1 wherein the means to communicate with the body-worn device is a tone activated by a wireless signal.

8. A portable tracking apparatus according to claim 1 wherein the means to communicate with the body-worn device is a voice message activated by a wireless signal.

9. A portable tracking apparatus according to claim 1 wherein the means for determining movement of the portable tracking apparatus is a three degree of freedom motion detector.

10. A portable tracking apparatus for use in a wireless communication system, the portable tracking apparatus responsive to a message from the wireless communication system for determining its own spatial coordinates and conveying the spatial coordinates to a central data-base, the portable tracking apparatus adapted to communicate with a body-worn device, the portable tracking apparatus comprising (a) a housing having a top and bottom cover and four side walls, the top cover containing a message display and subject response switches, the bottom cover containing a battery pack and a connector panel for mating with a recharging stand, the top cover and bottom cover being affixed to the housing side walls by tamper resistant screws;

(b) a memory card and a processor mounted within the housing for use with an algorithm to compare the current location of the portable tracking apparatus with a schedule of rules and location constraints stored in the memory card;

(c) a means mounted within the housing to communicate with the central data-base and the body worn device; and (d) a motion detector mounted within the housing for determining movement of the portable tracking apparatus.

11. A portable tracking apparatus according to claim 10 wherein side walls of the housing contain grooves to mate with tangs on a top surface of the recharging stand.

12. A portable tracking apparatus according to claim 11 wherein a connector panel in the recharging stand contains an interface for external connections to the portable tracking apparatus.

13. A portable tracking apparatus according to claim 10 wherein the tamper resistant screws are electrically connected to the memory card and processor.

14. A portable tracking apparatus according to claim 10 wherein wireless means convey signals between the body-worn device and the portable tracking apparatus.

15. A portable tracking apparatus according to claim 10 wherein the algorithm provides for a preset distance allowable between the body-worn device and the portable tracking apparatus.

16. A method for use with a wireless communication system to determine by spatial coordinates the location of a portable tracking apparatus adapted to communicate with a subject's body-worn device and a central data-base, the method comprising (a) providing the portable tracking device with a means to communicate with a global positioning system satellite constellation to determine its position, (b) the portable tracking device sending signals to the central data-base to confirm the position of the portable tracking device, (c) the portable tracking device sending and receiving wireless signals to and from the body-worn device, (d) the portable tracking device sending an alarm to the central data-base if a subject tampers with the portable tracking device or body-worn device, (e) the portable tracking device receiving communications from the central data-base to download updated schedule rules and location constraints on the subject, (f) the portable tracking device providing a warning to the subject if the subject deviates from a programmed area of travel, and (g) the central data-base providing warnings to a subject victim if a subject offender violates a zone of protection.

17. The method according to claim 16 wherein the body-worn device sends a panic signal to the central data-base through the portable tracking device if the subject presses a panic button on the body-worn device.

18. The method according to claim 16 wherein the central data-base builds reports on the subject based on signals from the portable tracking apparatus.

19. The method according to claim 16 wherein the warning to the subject is a digitized voice message emanating from the portable tracking apparatus.

20. The method according to claim 16 wherein the warning to the subject is an audio tone message emanating from the portable tracking apparatus.

* * * * *